United States Patent
Achola et al.

(10) Patent No.: US 10,129,184 B1
(45) Date of Patent: Nov. 13, 2018

(54) DETECTING THE SOURCE OF LINK ERRORS IN A CUT-THROUGH FORWARDING NETWORK FABRIC

(71) Applicant: Amazon Technologies, Inc., Seattle, WA (US)

(72) Inventors: Michael Achola, Dublin (IE); Andreas Louca, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 508 days.

(21) Appl. No.: 14/867,468

(22) Filed: Sep. 28, 2015

(51) Int. Cl.
*H04L 12/939* (2013.01)
*H04L 12/947* (2013.01)
*H04L 12/26* (2006.01)

(52) U.S. Cl.
CPC ........ *H04L 49/555* (2013.01); *H04L 43/0823* (2013.01); *H04L 43/10* (2013.01); *H04L 49/251* (2013.01)

(58) Field of Classification Search
CPC ... H04L 49/555; H04L 43/0823; H04L 43/10; H04L 49/251
See application file for complete search history.

(56) References Cited

U.S. PATENT DOCUMENTS

| | | | | |
|---|---|---|---|---|
| 2003/0016624 A1* | 1/2003 | Bare | ................ | H04L 29/12009 370/217 |
| 2003/0091165 A1* | 5/2003 | Bearden | .............. | H04L 41/0213 379/88.08 |
| 2004/0258409 A1* | 12/2004 | Sadananda | .............. | H04L 45/02 398/50 |
| 2005/0060598 A1* | 3/2005 | Klotz | .................. | G06F 11/2257 714/4.2 |
| 2007/0177523 A1* | 8/2007 | Nagami | .............. | H04L 41/0631 370/252 |
| 2007/0220303 A1* | 9/2007 | Kimura | ............... | G06F 11/0709 714/4.11 |
| 2008/0002576 A1* | 1/2008 | Bugenhagen | ......... | H04L 41/147 370/229 |
| 2009/0307539 A1* | 12/2009 | Ozaki | ................ | H04L 41/0677 714/57 |
| 2009/0323537 A1* | 12/2009 | Yamamoto | .......... | H04L 41/0677 370/242 |
| 2011/0161489 A1* | 6/2011 | Bhatt | .................... | H04L 45/245 709/224 |
| 2011/0283037 A1* | 11/2011 | Koga | .................... | G06F 11/201 710/313 |
| 2012/0039163 A1* | 2/2012 | Nakajima | ........... | H04L 41/0654 370/217 |
| 2012/0057601 A1* | 3/2012 | Voruganti | ........... | H04L 12/5601 370/401 |
| 2012/0106358 A1* | 5/2012 | Mishra | ................ | H04L 43/0817 370/242 |

(Continued)

*Primary Examiner* — Gregory Sefcheck
*Assistant Examiner* — Jael Ulysse
(74) *Attorney, Agent, or Firm* — Klarquist Sparkman, LLP

(57) ABSTRACT

Techniques and solutions are provided for detecting the source of link errors in a cut-through forwarding network fabric. For example, a network link that is the source of the link errors can be automatically located by polling a network device a number of times to identify a network interface that has an increasing error rate and tracing network interface error rates back through one or more upstream network devices to locate the network link that is the source of the link errors.

19 Claims, 8 Drawing Sheets

(56) References Cited

U.S. PATENT DOCUMENTS

| | | | |
|---|---|---|---|
| 2014/0064056 A1* | 3/2014 | Sakata | H04L 41/00 370/216 |
| 2014/0071834 A1* | 3/2014 | Sun | H04L 41/0677 370/242 |
| 2014/0164609 A1* | 6/2014 | Kay | H04L 63/1416 709/224 |
| 2014/0226485 A1* | 8/2014 | Heinz | H04L 41/0806 370/235 |
| 2015/0055451 A1* | 2/2015 | Holmberg | H04L 49/557 370/218 |
| 2015/0195162 A1* | 7/2015 | Gandham | H04L 43/067 709/206 |
| 2016/0142269 A1* | 5/2016 | Konduru | H04L 43/026 709/224 |
| 2016/0239371 A1* | 8/2016 | Jose | G06F 11/0793 |
| 2017/0078435 A1* | 3/2017 | Babol | H04L 67/2842 |

* cited by examiner

DETECTING THE SOURCE OF LINK ERRORS IN A CUT-THROUGH FORWARDING NETWORK FABRIC

BACKGROUND

In order to communicate network traffic between a source device and a destination device, packet forwarding networks forward packets between networking devices, such as routers and switches, along the path between the source and the destination. In some networks, network fabrics implement various forwarding strategies, which can include store-and-forward and cut-through forwarding. With cut-through forwarding, the networking device does not have to wait for the entire packet to be received before forwarding it on to the next device.

While cut-through forwarding can reduce the latency of packets being transmitted through the network, cut-through forwarding has some drawbacks. For example, with cut-through forwarding it may be difficult to identify the particular location of a network error because a number of networking devices may register the error.

DETAILED DESCRIPTION

Overview

Figure 1:
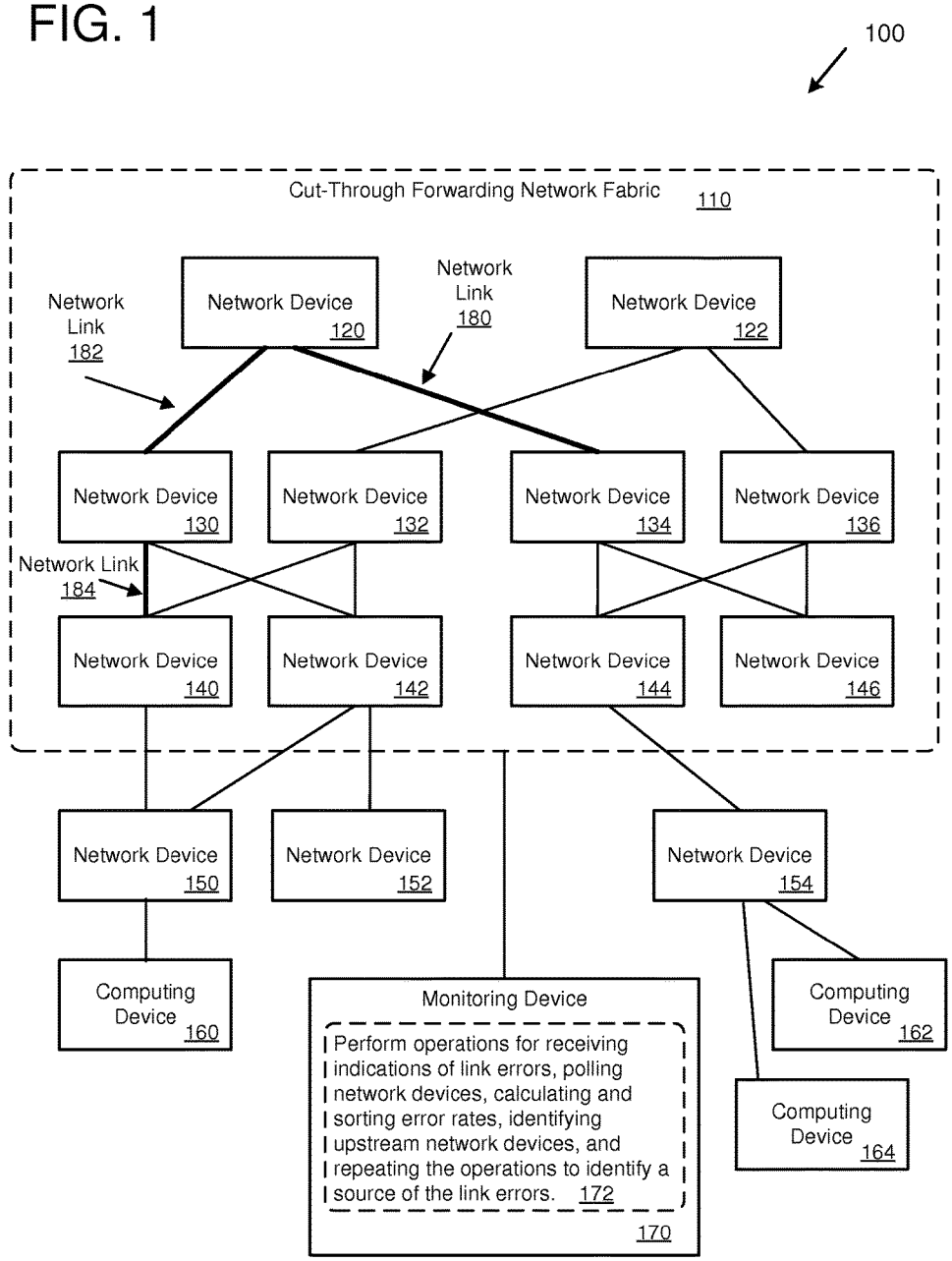
FIG. 1 is a diagram of an example environment in which the source of link errors can be automatically determined for a cut-through forwarding network fabric.

The following description is directed to technologies for automatically detecting the source of link errors in a cut-through forwarding network fabric and locating a network link that is the source of the link errors. In some implementations, automatically detecting link errors is performed by polling a network device a number of times to collect link error statistics for network interfaces of the network device. For example, the network device can be identified by receiving an alarm indicating that the network device is experiencing link errors. From the link error statistics collected by the polling, error rates are calculated for the network interfaces of the network device, and one of the network interfaces is identified that has an increasing rate of inbound link errors (e.g., the highest increasing rate of inbound link errors). The network interface with the increasing rate of inbound link errors is then followed to the upstream network device connected to the network interface. The process is repeated at the upstream network device (and possibly additional upstream network devices) until the network link that is the source of the link errors is located.

If an upstream network device is reached that does not have any network interfaces with increasing link error rates, then the network link that is the source of the link errors is identified as the last network link traversed to reach the upstream network device. In some implementations, each upstream network device is checked to see if it is using cut-through forwarding, and if it is not then the last network link is determined to be the source of the link errors regardless of whether the upstream network device has any network interfaces with increasing rates of link errors.

Network devices generally use two types of forwarding strategies for network packets (also called frames), store-and-forward and cut-through forwarding. Cut-through forwarding provides a reduction in latency when compared to store-and-forward because the network device does not have to wait until the entire packet has been received before forwarding it on to the next network device or destination computing device.

The technologies described herein are implemented within the context of a network fabric, such as a multi-tiered network fabric, in which some or all of the network devices of the fabric are using cut-through forwarding (called a cut-through forwarding network fabric). In a multi-tiered network fabric, the network devices (routers and/or switches) are organized into a plurality of tiers. The network devices in a given tier forward traffic between the network devices in the previous tier and network devices in the next tier. In some types of tiered networks, the network devices in a given tier are fully meshed with the network devices in an adjacent tier (e.g., each router in a first tier is connected to every router in a second tier). In other types of tiered networks, the network connections between tiers are not fully meshed (e.g., a router in a given tier may be connected to every other router in an adjacent tier). As another example, groups of network devices in adjacent tiers can be interconnected within the group, but not interconnected between groups. One type of multi-tiered network fabric is a Clos network fabric. In some of the examples herein, a three-stage Clos network fabric is used to describe operation of various aspects of the technology. However, the technologies described herein can be implemented in any type of tiered network (e.g., a Clos network or another type of tiered network fabric).

With store-and-forward, detecting network packet errors can be straightforward as the packets can be evaluated at each network device before being forwarded on to the next network device or destination computing device. However, with cut-through forwarding, a network device that is reporting errors on its network interfaces may not be the source of the errors. The actual source of the errors may be further upstream. In order to determine the location of such link errors, a person (e.g., a network administrator or engineer) may have to investigate the various network devices and interfaces to try and identify the source of the errors, which can be a time consuming and inefficient process.

Using the technologies described herein, link errors can be automatically detected in a cut-through forwarding network fabric. For example, a device (e.g., a monitoring device, router, or another type of computing device) can automatically locate the network link that is the source of the link errors by polling a network device a number of times to identify a network interface that has an increasing error rate and tracing back through one or more upstream network devices to locate the network link that is the source of the link errors. In some implementations, the source of the link errors is the last network link traversed before the first of: reaching an upstream network device that does not use cut-through forwarding, and reaching an upstream network device that does not have any network interfaces within an increasing rate of link errors.

When tracing link errors, an upstream network device associated with a particular network interface can be identified in a number of ways. In some implementations, a pre-determined network topology is available which describes the network (e.g., at least the cut-through forwarding network fabric), including information describing how the network devices are connected. For example, a monitoring device can access a pre-determined network topology to determine the next upstream network device that is connected to a particular network interface of a particular network device of the fabric. The pre-determined network topology can also describe devices and connections outside the cut-through forwarding network fabric. In some implementations, a network state repository can be maintained that contains information (e.g., network devices, interface types and speeds, which device is connected to which network interface, etc.) describing the state of the network (e.g., at least the cut-through forwarding network fabric). The network state repository can be pre-configured and/or dynamically determined or updated. When an upstream network device needs to be identified, the network state repository can be consulted. For example, the network state repository can return the upstream network device connected via a particular network interface of a particular network device. In some implementations, network device and connectivity information can be determined using another protocol, such as link layer discovery protocol (LLDP) and/or Cisco® discovery protocol (CDP) (e.g., as a fallback procedure if a pre-determined network topology and a network state repository are not available).

In some implementations, an external monitoring device (external to the network fabric) performs at least some of the operations for automatically detecting link errors in a cut-through forwarding network fabric. In some implementations, at least some of the operations for automatically detecting link errors in a cut-through forwarding network fabric are performed by network devices (e.g., routers and/or switches of the network fabric).

In some implementations, polling network interfaces for inbound link errors is performed using the simple network management protocol (SNMP). For example, the network interfaces can be polled to collect values for inbound traffic error counters, such as SNMP ifInErrors counters. In some implementations, polling network interfaces for inbound link errors is performed using the network configuration protocol (NETCONF).

In some implementations, only inbound link errors are polled and used to calculate error rates. In some implementations, other link errors (e.g., outbound link errors) are used in addition to, or instead of, inbound link errors.

Polling of the network interfaces of network device is performed a number of times (e.g., with a delay between each polling instance). For example, the polling can be performed by polling each network interface a first time, waiting for a period of time (e.g., a number of seconds or minutes), and polling each interface a second time. In other implementations, the interfaces can be polled a different number of times and/or with a different delay period in between the polling instances. In some implementations, an exponential back off technique is used in which the time delay between polls is increased. For example, the time delay between the first poll and the second poll can be 15 seconds while the delay between the second poll and the third poll can be 30 seconds. For example, exponential back off can be implemented when there is no increase in the error rate calculated between the first and second poll.

Link errors can be caused by various networking issues. For example, link errors can be caused by a problem with a network interface (e.g., an electrical, optical, or mechanical issue) at either end of a network link. Link errors can also be caused by a problem with the network link itself (e.g., a physical issue such as a bend in the cable or physical damage).

Environments for Automatically Detecting Link Errors

In any of the implementations described herein, link errors can be automatically detected, and the source of the link errors can be automatically determined, in environments comprising cut-through forwarding network fabrics.

FIG. 1 is a diagram of an example environment 100 in which the source of link errors can be automatically determined for a cut-through forwarding network fabric 110. The cut-through forwarding network fabric 110 is a simplified Clos network used to illustrate operation of the technologies. In general, the technologies can be implemented within any type of cut-through forwarding network fabric (e.g., any type of multi-tiered network fabric that uses cut-through forwarding).

As depicted, the cut-through forwarding network fabric 110 (also called a cut-through domain) has three tiers of network devices. The first tier includes network devices 140, 142, 144, and 146, the second tier includes network devices 130, 132, 134, and 136, and the third tier includes network devices 120 and 122. The network links between network devices of the various tiers are also depicted. For example, network device 140 is connected to network devices 130 and 132. The topology of the cut-through forwarding network fabric 110 is an example of a pre-determined network topology in which the network devices are connected in a pre-determined arrangement.

In the example environment 100, a number of additional network devices are depicted that connect to the cut-through forwarding network fabric 110. For example, network devices 150, 152, and 154 connect to one or more network devices of the cut-through forwarding network fabric 110. In some implementations, the network devices 150, 152, and 154 are top-of-rack (TOR) switches that provide connectivity to computer servers, such as computing device 160, 162, and 164.

In some implementations, the example environment 100 operates within a data center. For example, the cut-through forwarding network fabric 110 can provide redundant connectivity between racks of servers in which the racks of servers communicate between one another via TOR switches connected to the cut-through forwarding network fabric 110.

In the example environment 100, a monitoring device 170 performs operations for automatically detecting the source of link errors in the cut-through forwarding network fabric 110. For example, the monitoring device 170 can be a computing device (e.g., a server computer) that communicates with the network devices of the cut-through forwarding network fabric 110 via in-band network links (along with other devices of the network) and/or via management network links (e.g., used exclusively for management and control communications). As depicted at 172, the monitoring device 170 performs operations for receiving indications of link errors, polling network devices (e.g., network devices within the cut-through forwarding network fabric 110 and/or network devices outside the cut-through forwarding network fabric 110), calculating and sorting error rates, identifying upstream network devices, and repeating the operations to identify the source of link errors.

An example of automatically detecting a link error within the cut-through forwarding network fabric 110 can be illustrated using the example environment 100. In the example situation, the monitoring device 170 receives an indication that network device 134 is experiencing link errors. For example, the indication can be received in the form of an alert generated by network device 134 (e.g., triggered by increasing link error counter values for one or more network interfaces of network device 134). In response to the indication, monitoring device 170 polls network device 134 a number of times to collect link error statistics for the network interfaces of network device 134. In some implementations, the polling is performed twice, separated by a waiting period (e.g., a first poll and a second poll separated by a 15 second delay).

Based on results of the polling, the monitoring device 170 calculates error rates for the network device 134. In some implementations, the error rates reflect the difference in error count values between the polling instances. For example, if a particular interface has an inbound counter value of 10 when polled the first time and an inbound counter value of 15 when polled the second time, then the error rate can be calculated as 5. Once the error rates are calculated, a network interface of the network device 134 is identified that has an increasing rate of inbound link errors. In some implementations, the error rates are sorted and the network interface with the highest increasing rate of inbound link errors is identified.

Once the network interface of the network device 134 is identified, its corresponding network link is followed to the next upstream network device. In the example situation, network link 180 is identified and followed upstream to network device 120 where the operations are repeated. In the example situation, network device 120 also has a network interface with an increasing rate of inbound link errors, which is connected via network link 182 to the next upstream network device 130. In the example situation, network device 130 also has a network interface with an increasing rate of inbound link errors, which is connected via network link 184 to the next upstream network device 140. In the example situation, network device 140 does not have a network interface with an increasing rate of inbound link errors, and therefore the source of the link errors is determined to be the last network link traversed to reach network device 140, which is network link 184.

In some implementations, network devices are checked to determine whether they are using cut-through forwarding. In such implementations, when a network device does not use cut-through forwarding (e.g., because the network device is outside the cut-through boundary, as depicted by the cut-through forwarding network fabric 110) the last network link traversed is identified as the source of the link errors. Continuing the example situation, if network device 140 has a network interface with an increasing rate of inbound link errors that is connected to network device 150, then the monitoring device 170 can determine that network device 150 does not use cut-through forwarding (e.g., by querying network device 150 and/or by determining that network device 150 is outside the cut-through forwarding network fabric 110). In this situation, the monitoring device 170 can determine that the source of the link errors is the network link connecting network device 140 and network device 150 regardless of wither network device 150 has any network interfaces with increasing rates of inbound link errors.

In some implementations, an external monitoring device (external to the network fabric) performs at least some of the operations for automatically detecting link errors in a cut-through forwarding network fabric. In some implementations, at least some of the operations for automatically detecting link errors in a cut-through forwarding network fabric are performed by network devices (e.g., routers and/or switches) of the network fabric.

Automatically Detecting Link Errors

In any of the implementations described herein, link errors can be automatically detected, and the source of the link errors can be automatically determined, by polling network devices and tracing link errors upstream.

Figure 2:
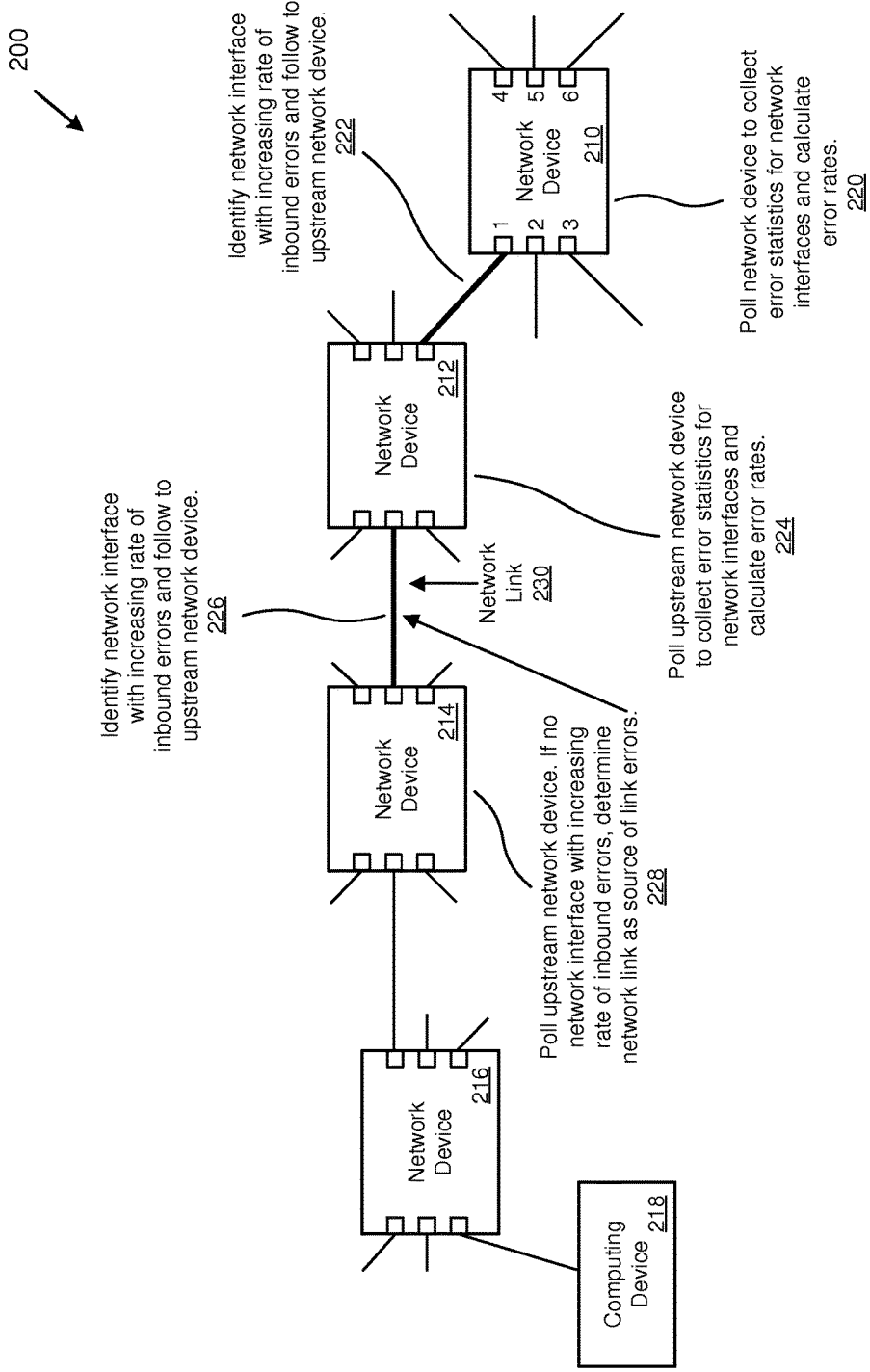
FIG. 2 is a diagram depicting an example of automatically determining a network link that is the source of link errors.

FIG. 2 is a diagram depicting an example 200 of automatically determining a network link that is the source of link errors. In the example 200, a number of network devices are depicted, including network devices 210, 212, 214, and 216 (e.g., switches and/or routers), as well as computing device 218 (e.g., a server computer or another type of computing devices). The network devices are part of a cut-through forwarding network fabric. For ease of illustration, only some of the network links are depicted in the example 200.

In the example 200, network device 210 is polled a number of times to collect error statistics for its network interfaces, as depicted at 220. In some implementations, all of the network interfaces of network device 210 are polled (network devices labeled 1 through 6). In some implementations, fewer than all of the network interfaces are polled (e.g., only those with a history of link errors). As depicted at 220, error rates are calculated from the error statistics. Based on the error rates, a network interface with an increasing rate of inbound errors is identified and followed to the next upstream network device, as depicted at 222. In example 200, network interface 1 of network device 210 is identified (e.g., because it has the highest increasing rate of inbound errors among the 6 network interfaces) and followed to network device 212.

In the example 200, the polling and calculating operations are repeated for network device 212, as depicted at 224. As depicted 226, a network interface of network device 212 is identified with an increasing rate of inbound errors (e.g., the highest increasing rate of inbound errors among the network interfaces of network device 212) and followed to the next upstream network device, which is network device 214.

In the example 200, the polling and calculating are operations are repeated for network device 214. However, as depicted at 228, if network device 214 does not have a network interface with an increasing rate of inbound errors, then the previous network link traversed to reach network device 214 is determined to be the network link causing the link errors. In the example, the cause of the link errors is therefore determined to be network link 230.

When a network link is determined to be the source of link errors, a variety of actions can be performed. For example, the network link can be automatically shut down and marked for maintenance. The network link can also be marked for maintenance without shutting it down. In some implementations, the decision to shut down a link (where no traffic can use the link) is made based on the type of devices connected to the link. For example, if the link connects two network devices (e.g., two routers and/or switches) within a network fabric, then the link can be shut down (e.g., because redundant links are available). However, if the link connects to a computing device (e.g., a server computer), then the link can be marked for maintenance and/or an alarm can be initiated while still permitting the link to be used for network traffic (e.g., because a redundant link may not be available and if the link is shut down then the computing device will but cut off from the network).

In some implementations, if one or more network interfaces of a network device have experienced link errors in the past, but current polling does not indicate any increase in the link errors, then the previous link errors can be determined to be transient errors (e.g., a transient event). Transient errors can be logged for later investigation.

In some implementations, telemetry data is used to determine which network interfaces of a particular network device to poll. For example, the telemetry data can include historical link error data (e.g., for the past hour or day) for a particular network device. If the particular network device is then polled, then only those interfaces (e.g., a subset of all the network interfaces of a particular network device) can be polled (e.g., only those that have reported link errors according to the telemetry data). In some implementations, the tracking link errors upstream to the source can be performed entirely based on telemetry data.

In some implementations, a monitoring device performs the operations depicted at 220, 222, 224, 226, and 228. For example, network device 210 can generate an alarm notifying the monitoring device that link errors have been detected.

Figure 3:
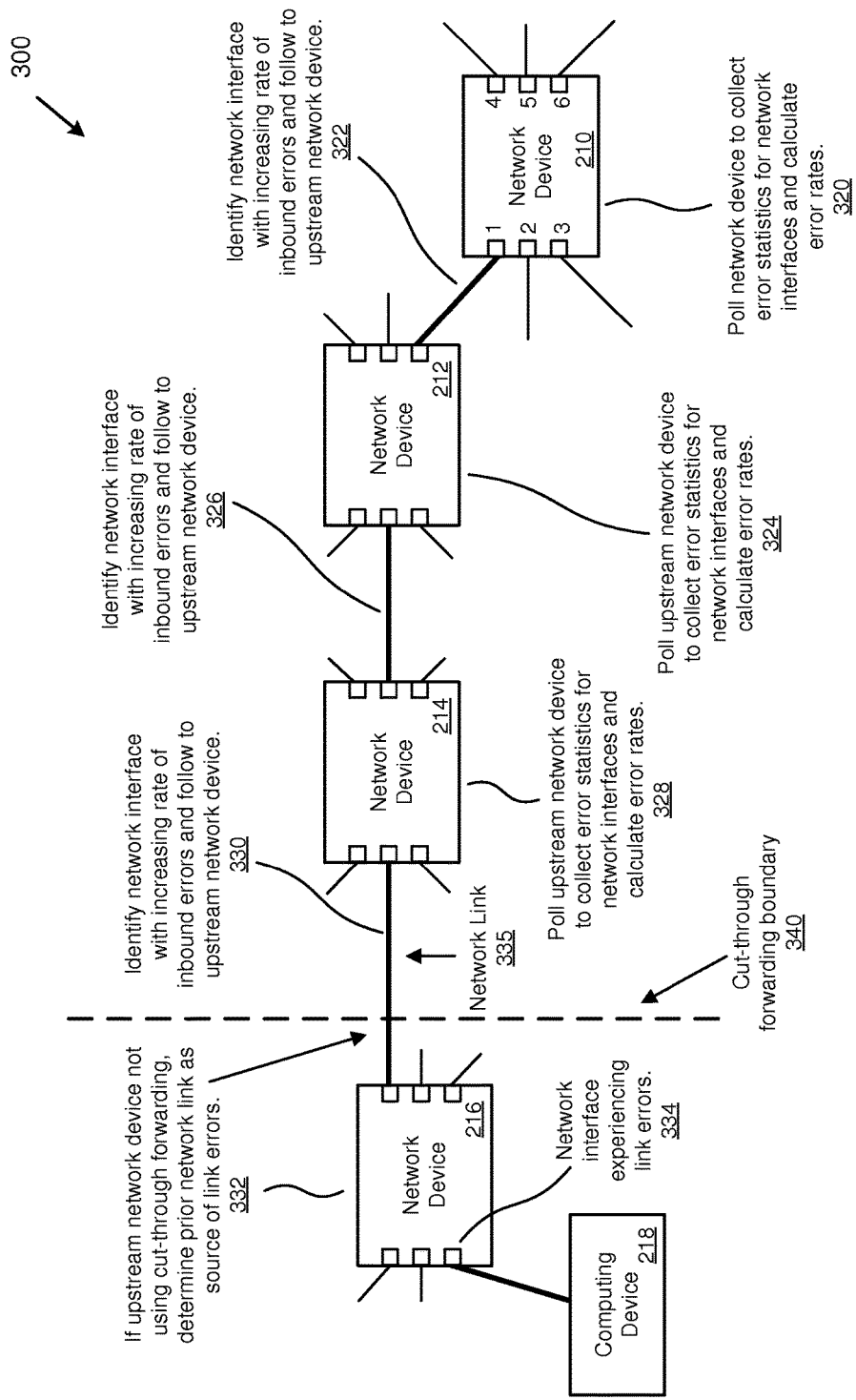
FIG. 3 is a diagram depicting an example of automatically determining a network link that is the source of link errors at a cut-through forwarding boundary.

FIG. 3 is a diagram depicting an example 300 of automatically determining a network link that is the source of link errors at a cut-through forwarding boundary. In the example 300, the same network devices and computing device as depicted in FIG. 2 are used to illustrate another scenario for determining the source of link errors.

As with the example 200, the source of the link errors in the example 300 is traced beginning with network device 210, which is polled to calculate error rates (as depicted at 320) and to identify the network interface with an increasing rate of inbound errors (as depicted at 322). The errors are then traced upstream through network device 212 and 214, by performing operations depicted at 324, 326, 328, and 330.

Where the example 300 differs from the example 200 is with network device 214 where a network interface with an increasing rate of inbound errors is identified (as depicted at 330). The associated network link 335 is then followed to the next upstream network device 216. However, network device 216 is not using cut-through forwarding (e.g., the cut-through forwarding mode is not enabled), which is also illustrated as network device 216 being outside the cut-through forwarding boundary 340. Because network device 216 is not using cut through forwarding, the previous network link (network link 335) traversed to reach network device 216 is determined to be the network link that is the cause of the link errors, as depicted at 332. This determination is made regardless of whether any network interfaces of network device 216 have an increasing rate of inbound errors. For example, as depicted at 334, a network interface of network device 216 is experiencing link errors (associated with the network link between network device 216 and computing device 218). Instead of following the link errors further upstream to network device 218, the previous network link (network link 335) traversed to reach network device 216 is determined to the be source of the link errors, regardless of the network interface errors depicted at 334.

Methods for Automatically Detecting Link Errors

In any of the technologies described herein, methods can be provided for automatically detecting link errors, and automatically determining the source of the link errors, in cut-through forwarding network fabrics.

Figure 4:
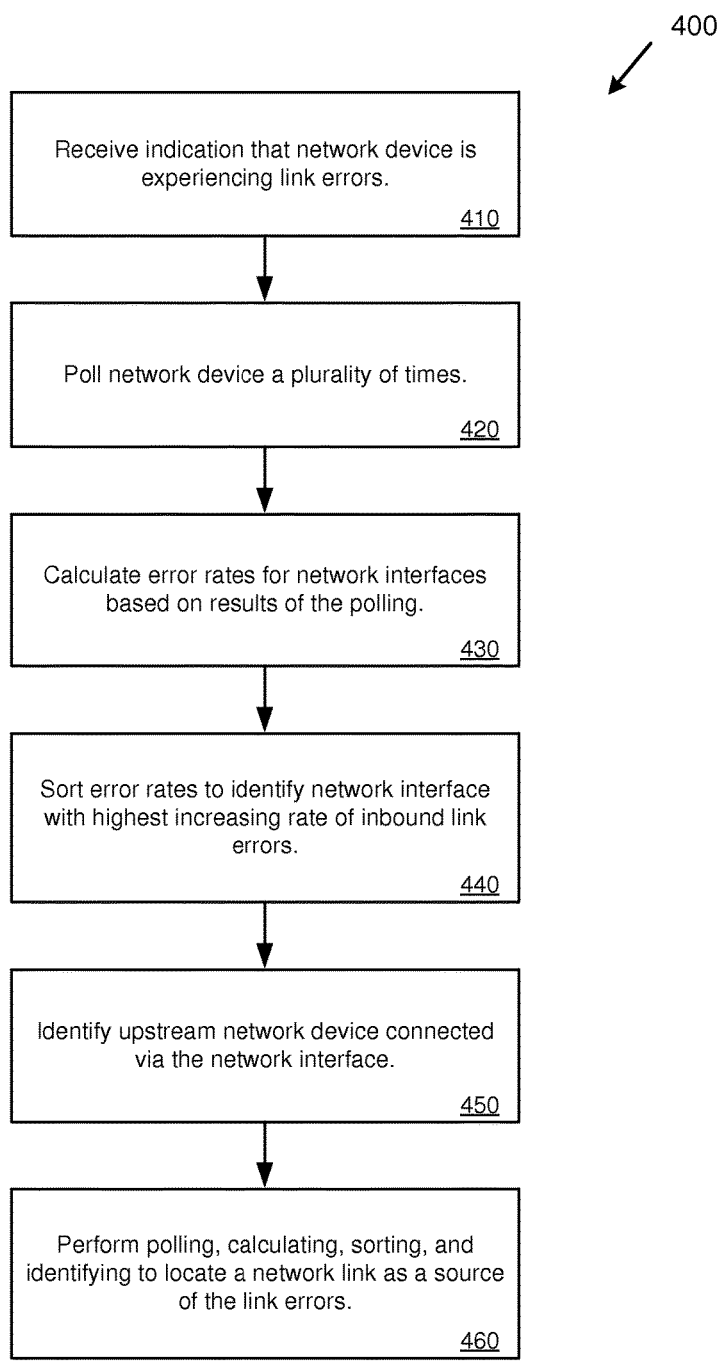
FIGS. 4, 5, and 6 are flowcharts of example methods for automatically detecting link errors in a cut-through forwarding network fabric.

FIG. 4 is a flow chart of an example method 400 for automatically detecting link errors in a cut-through forwarding network fabric. The example method 400 can be performed by a monitoring device (e.g., by monitoring device 170) or by another type of computing device. For example, a monitoring service running on one or more computing devices can perform operations including polling network devices, calculating error rates, and tracing the source of link errors to determine the network link that is the source of the link errors.

At 410, an indication is received that a network device of the cut-through forwarding network fabric is experiencing link errors. For example, the indication can be received via an alert generated by the network device.

At 420, the network device is polled a plurality of times to collect link error statistics for network interfaces of the network device. In some implementations, the polling is performed twice with a waiting period between (e.g., a first poll, a delay of 15 seconds, and then a second poll). In some implementations, the polling is performed a different number of times.

At 430, error rates are calculated for the network interfaces of the network device based on results of the polling. The error rates indicate whether the rate of inbound link errors is increasing. For example, if a first poll returns an error counter value of 25 and a second poll returns an error counter value of 25, then the rate would be calculated as zero (not increasing). However, if a first poll returns an error counter value of 25 and a second poll returns an error counter value of 42, then the rate would be calculated as 17 (an increasing rate).

At 440, the error rates calculated at 430 are sorted to identify the network interface of the network device with the highest increasing rate of inbound link errors. For example, if the network device has three interfaces with calculated error rates of 0 (for the first interface), 17 (for the second interface), and 5 (for the third interface), then the sorted error rates would identify the second interface (with 17) as having the highest increasing rate of inbound link errors (the interfaces could be sorted from highest to lowest as: the second interface with an error rate of 17, the third interface with an error rate of 5, and the third interface with an error rate of 0).

At 450, an upstream network device is identified that is connected via the network interface identified at 440. The upstream network device is the next upstream network device connected directly to the network interface identified at 440 via a network link (e.g., a fiber optic network link, an electrical network link, a wireless network link, or another type of network link).

At 460, polling, calculating, sorting, and identifying operations are performed at one or more upstream network devices to locate a network link that is the source of the link errors. The operations are repeated at the upstream network device identified at 450, and if the network link is not identified as the source, then the repeating is performed at one or more additional upstream network devices.

Figure 5:
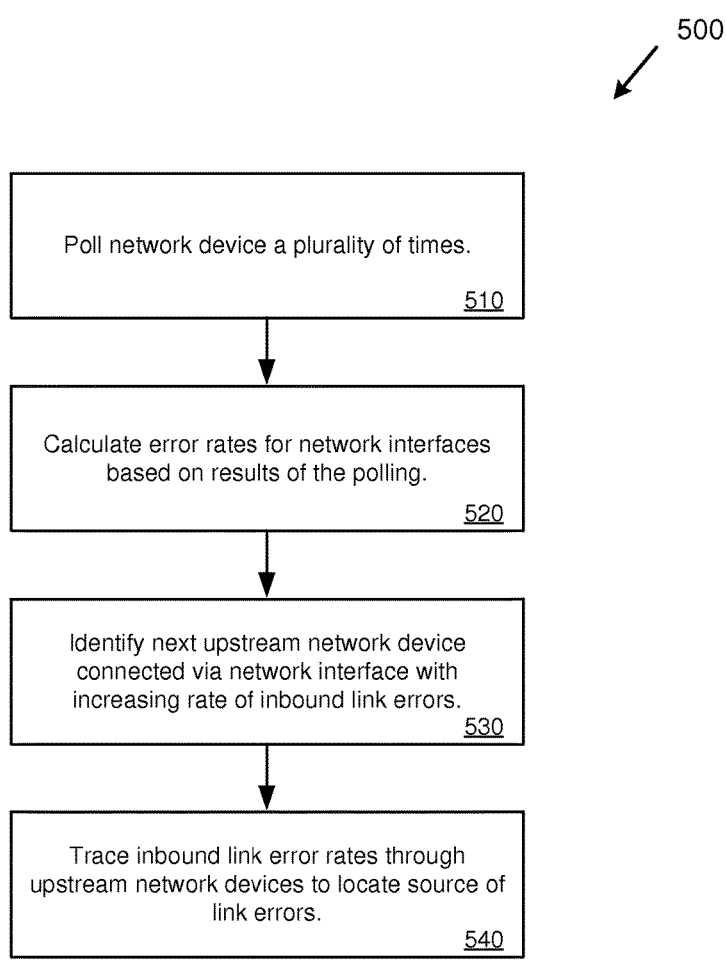

FIG. 5 is a flow chart of an example method 500 for automatically detecting link errors in a cut-through forwarding network fabric. The example method 500 can be performed by a monitoring device (e.g., by monitoring device 170) or by another type of computing device. For example, a monitoring service running on one or more computing devices can perform operations including polling network devices, calculating error rates, and tracing the source of link errors to determine the network link that is the source of the link errors.

At 510, a network device of the cut-through forwarding network fabric is polled a plurality of times to collect link error statistics for network interfaces of the network device. For example, the polling can be initiated upon receiving an indication (e.g., an alert) from the network device that it is experiencing link errors.

At 520, error rates are calculated for the network interfaces of the network device based on results of the polling. The error rates indicate whether the rate of inbound link errors is increasing.

At 530, a next upstream network device is identified that is connected via a network interface with an increasing rate of inbound link errors (based on the error rates calculated at 520). In some implementations, the network interface has the highest increasing rate of inbound link errors (e.g., the error rates calculated at 520 are sorted to identify the interface with the highest rate). The next upstream network device is connected directly to the network interface via a network link.

At 540, inbound link error rates are traced through upstream network devices, beginning with the next upstream network device identified at 530, to locate the network link that is the source of the link errors.

Figure 6:
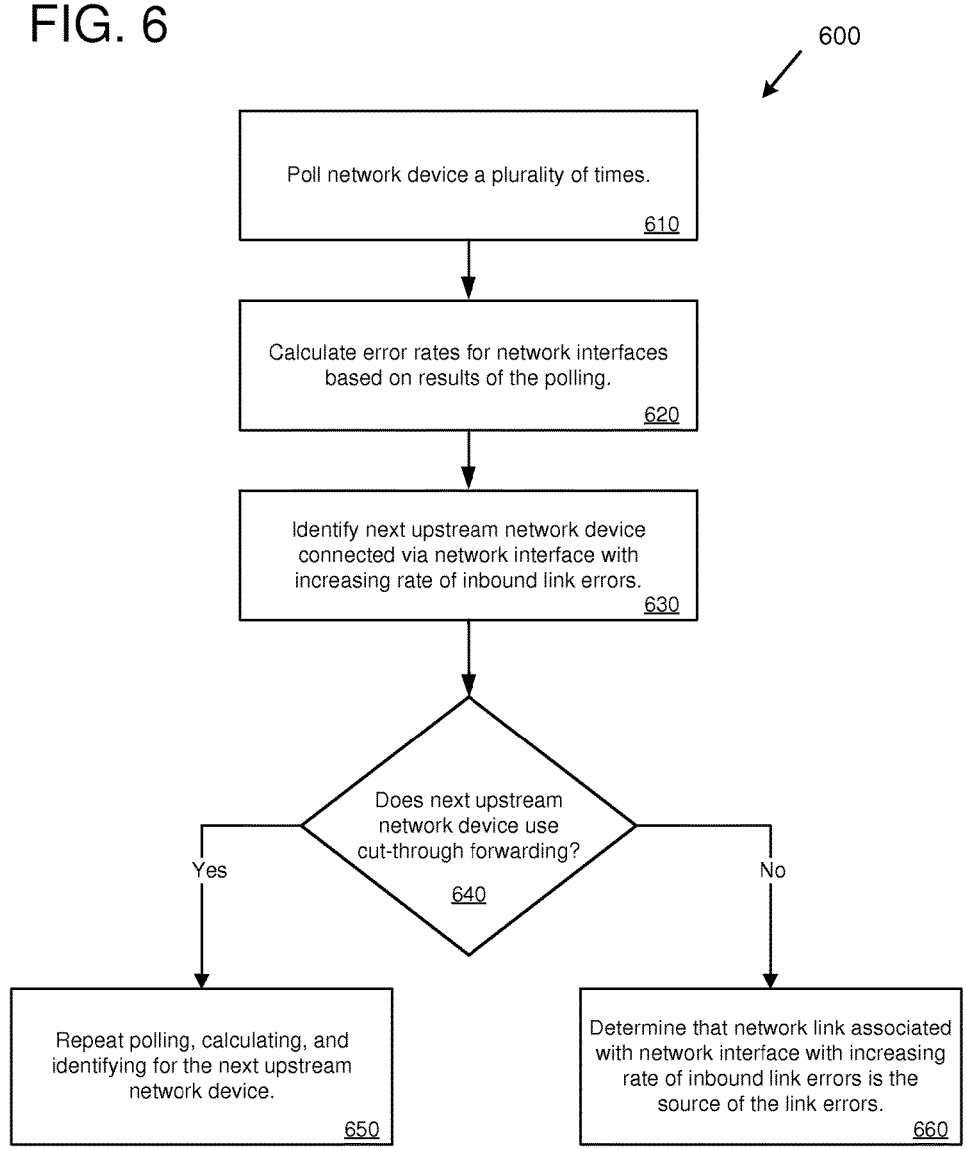

FIG. 6 is a flow chart of an example method 600 for automatically detecting link errors in a cut-through forwarding network fabric. The example method 600 can be performed by a monitoring device (e.g., by monitoring device 170) or by another type of computing device. For example, a monitoring service running on one or more computing devices can perform operations including polling network devices, calculating error rates, and tracing the source of link errors to determine the network link that is the source of the link errors.

At 610, a network device of the cut-through forwarding network fabric is polled a plurality of times to collect link error statistics for network interfaces of the network device. For example, the polling can be initiated upon receiving an indication (e.g., an alert) from the network device that it is experiencing link errors.

At 620, error rates are calculated for the network interfaces of the network device based on results of the polling. The error rates indicate whether the rate of inbound link errors is increasing.

At 630, a next upstream network device is identified that is connected via a network interface with an increasing rate of inbound link errors (based on the error rates calculated at 620). In some implementations, the network interface has the highest increasing rate of inbound link errors (e.g., the error rates calculated at 620 are sorted to identify the interface with the highest rate). The next upstream network device is connected directly to the network interface via a network link.

At 640, a check is performed to determine whether the next upstream network device is using cut-through forwarding (e.g., whether a cut-through forwarding mode is enabled). If the next upstream network device is using cut-through forwarding, then the method proceeds to 650 where the polling, calculating, and identifying operations are repeated for the next upstream network device in order to trace the source of the link errors.

If the next upstream network device is not using cut-through forwarding, then the method proceeds to 660 where the network interface with the increasing rate of inbound link errors identified at 630 is determined to be the network link that is the source of the link errors. The network link can be identified as the source because link errors would not carry through the next upstream network device if it is not using cut-through forwarding.

In some implementations, link errors are traced to upstream network devices (e.g., by following the network interface at each network device with the highest increasing error rate) until an upstream network device is reached that does not have an increasing rate of inbound link errors. When this happens, the source of the link errors is determined to be the last network link traversed to reach the upstream network device that does not have an increasing rate of inbound link errors. Reaching a network device that does not have a network interface with an increasing rate of inbound link errors indicates that the source of the link errors is not in the upstream direction, and therefore the source of the link errors is likely the previous link that was traversed and that had an increasing rate of inbound link errors at the previous network device.

In some implementations, network error rates for an upstream network device are calculated only if the upstream network device is using cut-through forwarding. If the upstream network device is not using cut-through forwarding, then the last network link traversed to reach the upstream network device is determined to be the source of the link errors.

Determining that a network link is the source of link errors can indicate that the network link itself has a physical or electrical problem, that one of the network interfaces has a problem (e.g., a loose optical or electrical connection) and/or that one of the network devices connected at either end has a problem (e.g., a defective network interface board).

Example Service Provider Environments

Figure 7:
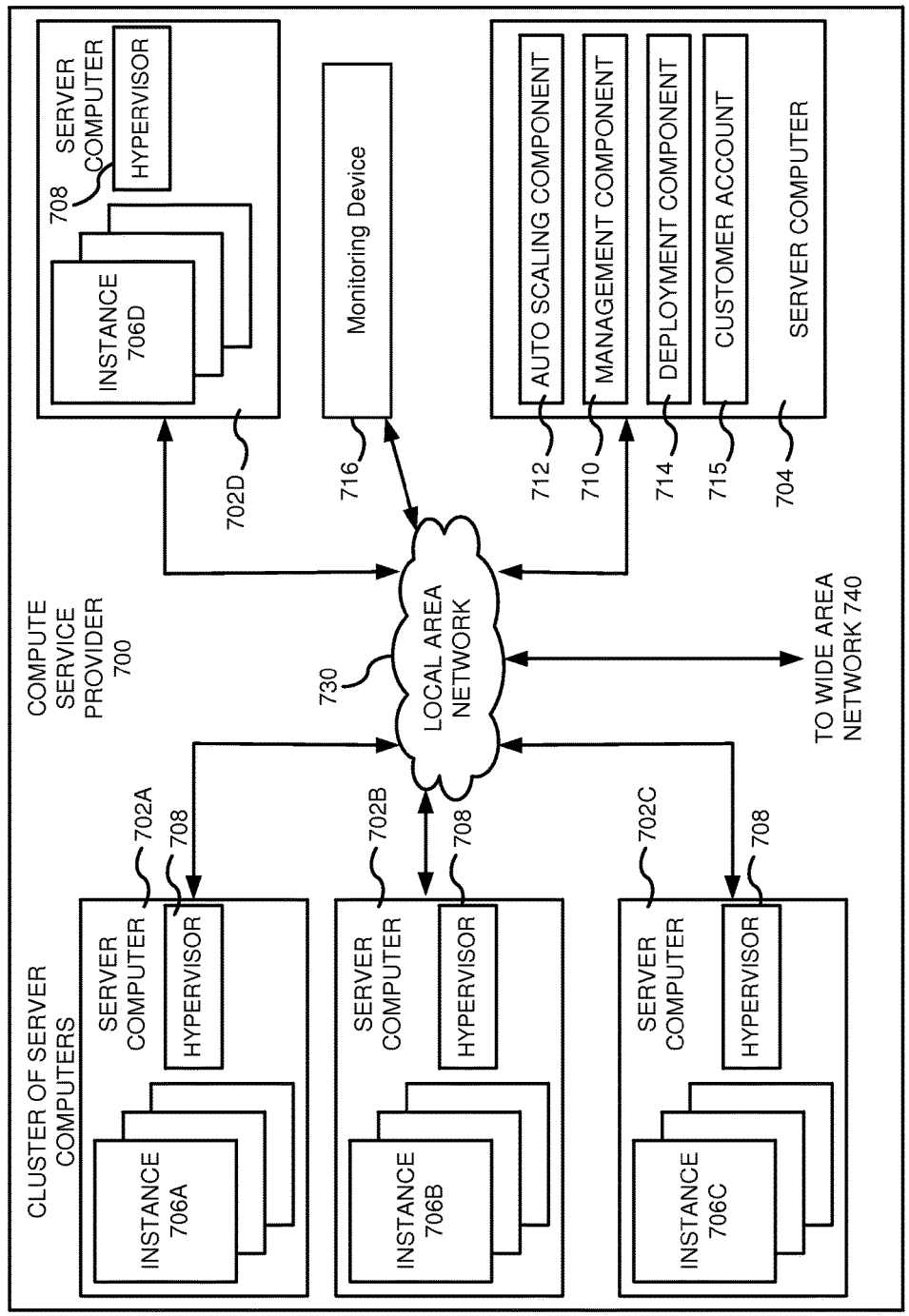
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise a Clos network. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In some implementations, a monitoring device 716 performs operations for automatically detecting link errors, and automatically locating the source of the link errors, in a cut-through forwarding network fabric (part of the local area network 730). For example, the cut-through forwarding network fabric can connect to TOR devices (e.g., network switches) that service the server computers 720A-720D. The monitoring device 716 can receive alerts when network devices are experiencing link errors, poll network devices to collect link error statistics, calculate error rates, and trace the source of the link errors through the network devices of the cut-through forwarding network fabric to automatically determine the network link that is the source of the link errors.

Figure 8:
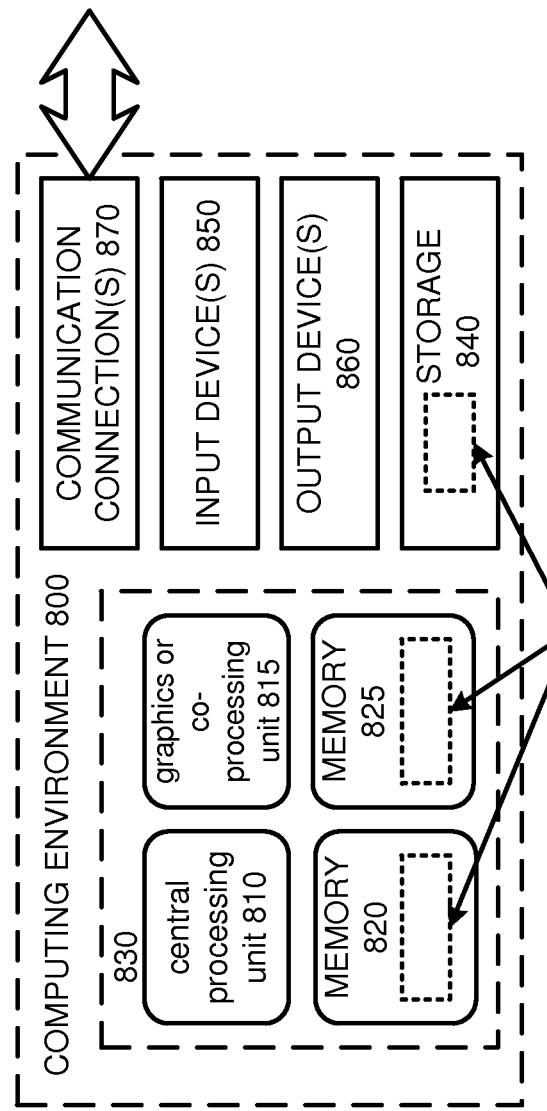
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a monitoring device, for automatically detecting a source of link errors in a cut-through forwarding network fabric, the method comprising:

receiving, by the monitoring device, an indication that a network device of the network fabric is experiencing link errors;

polling, by the monitoring device, the network device a plurality of times to collect link error statistics for network interfaces of the network device;

based on results of the polling, calculating, by the monitoring device, respective error rates for the network interfaces of the network device by determining a difference in inbound traffic error count values between the plurality of times the polling is performed;

sorting the error rates for the network interfaces to identify one of the network interfaces with a highest increasing rate of inbound link errors;

identifying, by the monitoring device, an upstream network device connected via the network interface with the highest increasing rate of inbound link errors, wherein the cut-through forwarding network fabric is described by a pre-determined network topology, and wherein the upstream network device is identified based on the pre-determined network topology; and based on identifying the upstream network device connected via the network interface with the highest increasing rate of inbound link errors, repeating, by the monitoring device, the polling, the calculating, the sorting, and the identifying for one or more upstream network devices, including the upstream network device connected via the network interface with the highest increasing rate of inbound link errors, to locate a network link as the source of the link errors in the cut-through forwarding network fabric;

upon locating the network link as the source of the link errors:

when the network link connects upstream to an upstream network device that has at least one redundant network link, shutting down the network link.

2. The method of claim 1, upon locating the network link as the source of the link errors:

when the network link connects upstream to an upstream network device that does not have at least one redundant network link, outputting an indication that the network link is the source of the link errors without shutting down the network link.

3. The method of claim 1 wherein polling the network device is performed by polling, using simple network management protocol (SNMP), the network device to collect inbound traffic error count values for the network interfaces of the network device by reading SNMP ifInErrors counters for the network interfaces.

4. The method of claim 1 wherein the repeating is performed until an upstream network device, of the one or more upstream network devices, is reached that does not have an increasing rate of inbound link errors, and wherein the source of the link errors is determined to be a last network link traversed to reach the upstream network device that does not have an increasing rate of inbound link errors.

5. The method of claim 1 wherein the repeating is performed until an upstream network device, of the one or more upstream network devices, is reached that does not support cut-through forwarding, and wherein the source of the link errors is determined to be a last network link traversed to reach the upstream network device that does not support cut-through forwarding.

6. A computing device comprising:

one or more processing units;

wherein the computing device is configured to perform operations for detecting a source of link errors in a cut-through forwarding network fabric, the operations comprising:

polling a network device of the network fabric a plurality of times to collect link error statistics for network interfaces of the network device;

based on results of the polling, calculating respective error rates for the network interfaces of the network device;

based on the calculated error rates, identifying a next upstream network device connected via one of the network interfaces, the one of the network interfaces having an increasing rate of inbound link errors;

based on identifying the next upstream network device, tracing inbound link error rates through one or more upstream network devices, including the next upstream network device, to locate a network link as the source of the link errors, wherein the tracing inbound link error rates through one or more upstream network devices comprises performing respective polling, calculating, and identifying for each of the one or more upstream network devices to locate the network link as the source of the link errors in the cut-through forwarding network fabric; and upon locating the network link as the source of the link errors, shutting down the network link and marking the network link for maintenance.

7. The computing device of claim 6 wherein polling the network device is performed by polling, using simple network management protocol (SNMP) or network configuration protocol (NETCONF), the network device to collect inbound traffic error count values for the network interfaces of the network device.

8. The computing device of claim 6 wherein tracing the inbound link error rates through the one or more upstream network devices is performed, at least in part, using a pre-determined network topology comprising network connectivity information for the cut-through forwarding network fabric.

9. The computing device of claim 6, the operations further comprising:

sorting the calculated error rates for the network interfaces, wherein the network interface with the increasing rate of inbound link errors has a highest increasing rate of inbound link errors.

10. The computing device of claim 6 wherein the polling is performed at least a first time and a second time separated by a waiting period.

11. The computing device of claim 6 wherein calculating the error rates for the network interfaces of the network device comprises:

determining a difference in inbound traffic error count values between the plurality of times the polling is performed.

12. The computing device of claim 6, the operations further comprising:

receiving an alarm indicating that the network device of the network fabric is experiencing link errors.

13. The computing device of claim 6 wherein the tracing inbound link error rates through one or more upstream network devices continues until:
- one of the upstream network devices is encountered that does not have an increasing rate of inbound link errors; or
- one of the upstream network devices is reached that does not support cut-through forwarding;
- wherein a last network link traversed to reach the one of the upstream network devices is determined to be the network link that is the source of the link errors.

14. A computer-readable storage medium storing computer-executable instructions for causing a computing device to perform operations for detecting a source of link errors in a cut-through forwarding network fabric, the operations comprising:
- polling a network device of the network fabric a plurality of times to collect link error statistics for network interfaces of the network device;
- based on results of the polling, calculating respective error rates for the network interfaces of the network device by determining a difference in inbound traffic error count values between the plurality of times the polling is performed;
- based on the calculated error rates, identifying a next upstream network device connected via one of the network interfaces with an increasing rate of inbound link errors;
- determining whether the next upstream network device is using cut-through forwarding;
- when the next upstream network device is not using cut-through forwarding, determining that a network link associated with the network interface with the increasing rate of inbound link errors is the source of the link errors;
- when the next upstream network device is using cut-through forwarding, performing respective polling, calculating, the identifying operations for the next upstream network device to locate a network link as the source of the link errors in the cut-through forwarding network fabric; and
- upon locating the network link as the source of the link errors, shutting down the network link and marking the network link for maintenance.

15. The computer-readable storage medium of claim 14 wherein polling the network device is performed by polling, using simple network management protocol (SNMP), the network device to collect inbound traffic error count values for the network interfaces of the network device.

16. The computer-readable storage medium of claim 14, the operations further comprising:
- sorting the calculated error rates for the network interfaces, wherein the network interface with the increasing rate of inbound link errors has a highest increasing rate of inbound link errors.

17. The computer-readable storage medium of claim 14 wherein polling the network device of the network fabric a plurality of times to collect link error statistics for network interfaces of the network device comprises:
- determining a subset of all the network interfaces of the network device based, at least in part, on telemetry data of the network device comprising past link error data; and
- wherein the polling is performed for only the determined subset of all the network interfaces of the network device.

18. The computer-readable storage medium of claim 14 wherein the polling is performed at least a first time and a second time separated by a waiting period.

19. The computer-readable storage medium of claim 14, the operations further comprising:
- when the error rates calculated for the next upstream network device indicate a network interface with an increasing rate of inbound link errors, continuing to trace a source of the link errors to one or more subsequent upstream network devices; and
- when the error rates calculated for the next upstream network device do not indicate any network interface with an increasing rate of inbound link errors, determining the network link associated with the network interface with the increasing rate of inbound link errors as a source of the link errors.

* * * * *